US012361853B2

(12) United States Patent
Tsai et al.

(10) Patent No.: US 12,361,853 B2
(45) Date of Patent: Jul. 15, 2025

(54) IMAGE DISPLAY APPARATUS AND SYSTEM AS WELL AS IMAGE DISPLAYING METHOD THEREOF

(71) Applicant: BENQ CORPORATION, Taipei (TW)

(72) Inventors: Hung-Chi Tsai, Taipei (TW); Chen-Cheng Huang, Taoyuan (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 18/611,938

(22) Filed: Mar. 21, 2024

(65) Prior Publication Data

US 2024/0233598 A1 Jul. 11, 2024

Related U.S. Application Data

(62) Division of application No. 17/723,603, filed on Apr. 19, 2022, now Pat. No. 12,002,399.

(30) Foreign Application Priority Data

Nov. 4, 2021 (TW) ................................ 110141143

(51) Int. Cl.
*G09G 3/20* (2006.01)
*G09G 3/00* (2006.01)

(52) U.S. Cl.
CPC ........... *G09G 3/2003* (2013.01); *G09G 3/002* (2013.01); *G06T 2207/10016* (2013.01);
(Continued)

(58) Field of Classification Search
CPC .............. G09G 2320/0673; G09G 2320/0271; G09G 2320/0666; G09G 2320/0633; G09G 2340/06; G09G 2360/16; G09G 5/02; G09G 3/2003; G09G 2320/0242; G09G 2320/103; G09G 2320/106; G09G 2320/10;
(Continued)

(56) References Cited

U.S. PATENT DOCUMENTS

| | | | | |
|---|---|---|---|---|
| 2006/0257048 A1 | 11/2006 | Lin | | |
| 2007/0273628 A1 | 11/2007 | Sato | | |
| 2008/0186324 A1* | 8/2008 | Chiang | G09G 3/3611 | 345/589 |

(Continued)

FOREIGN PATENT DOCUMENTS

| | | |
|---|---|---|
| CN | 104243850 B | 4/2018 |
| CN | 109949385 A | 6/2019 |

(Continued)

*Primary Examiner* — Dismery Mercedes

(57) ABSTRACT

An image display method for handling a dynamic image signal including a plurality of continuous video frames, wherein the method includes steps as follows: Firstly, a first display parameter is output to display an Nth video frame of the plurality of continuous video frames according to a first attribute data of the Nth video frame. Then, at least one of (N+K)th video frame is detected, and when the at least one of the (N+K)th video frame has second attribute data, the first display parameter is output to display the at least one of the (N+K)th video frames. Subsequently, an (N+K+1)th video frame is detected, and when the (N+K+1)th video frame has the second attribute data, a second display parameter is output to display the (N+K+1)th video frame according to the second attribute data. Wherein, K is a positive integer greater than 1.

3 Claims, 6 Drawing Sheets

1st frame V1 | Nth frame Vn | (N+1)th frame Vn+1 | (N+2)th frame Vn+2 | (N+3)th frame Vn+3 | (N+4)th frame Vn+4 | (N+5)th frame Vn+5 | (N+6)th frame Vn+6

101a ... scene switching

Brightness (%) / Voltage (V)

D1 D1 D3 D2

(52) U.S. Cl.
CPC .............. *G06T 2207/10024* (2013.01); *G09G 2320/066* (2013.01); *G09G 2320/0666* (2013.01); *G09G 2320/0673* (2013.01); *G09G 2320/103* (2013.01); *G09G 2360/12* (2013.01); *G09G 2360/16* (2013.01)

(58) Field of Classification Search
CPC ............ G09G 2360/12; G09G 2320/06; G06T 2207/10016; G06T 7/90; G06T 2207/10024; G06T 7/194; G06T 7/60; G06T 5/50; G06T 7/73
See application file for complete search history.

(56) References Cited

U.S. PATENT DOCUMENTS

| | | | | |
|---|---|---|---|---|
| 2009/0263023 | A1* | 10/2009 | Iwamoto | H04N 5/2625 382/199 |
| 2011/0148947 | A1* | 6/2011 | Chen | G09G 3/2025 345/690 |
| 2014/0247289 | A1* | 9/2014 | Park | G09G 3/2055 345/88 |
| 2016/0104408 | A1* | 4/2016 | Kim | G09G 3/36 345/690 |
| 2017/0127063 | A1* | 5/2017 | Li | H04N 19/142 |
| 2018/0025700 | A1 | 1/2018 | Suzuki | |
| 2020/0304809 | A1* | 9/2020 | Komiya | H04N 19/146 |
| 2020/0380261 | A1* | 12/2020 | Chandran | G06V 10/764 |
| 2021/0081671 | A1 | 3/2021 | Hu | |
| 2023/0164329 | A1 | 5/2023 | Takahashi | |

FOREIGN PATENT DOCUMENTS

| | | | |
|---|---|---|---|
| CN | 111263188 | A | 6/2020 |
| TW | 538637 | B | 6/2003 |
| TW | 201141242 | A | 11/2011 |

* cited by examiner

IMAGE DISPLAY APPARATUS AND SYSTEM AS WELL AS IMAGE DISPLAYING METHOD THEREOF

This application is a divisional application of co-pending application Ser. No. 17/723,603, filed on Apr. 19, 2022 which claims the benefit of Taiwan application Serial No. 110141143, filed Nov. 4, 2021, the subject matter of which is incorporated herein by reference.

BACKGROUND OF THE DISCLOSURE

Field of the Disclosure

The disclosure relates in general to a multimedia display apparatus, multimedia system and the method applying the same and more particularly to an image display apparatus, an image display system and the method applying the same.

Description of the Related Art

With the development of consumer electronic products, various image display apparatuses, such as projectors or flat-panel displays, have been widely used in daily life or commercial markets to provide a variety of audiovisual content.

However, blame on Mosaic phenomenon (noise) resulted from short-term data changes (such as rapid scene switching) and flashlight effect caused by an instantaneous change in color, the scene of the image based on multimedia data (such as color-multimedia video images) cannot be switched smoothly. Especially when the video frame scenes in a video film are switched very frequently, this flash effect will be particularly obvious, which may adversely affect the viewing quality.

Therefore, there is a need to provide an advanced image display apparatus, an image display system and the method applying the same to overcome the drawbacks of the prior art.

SUMMARY OF THE DISCLOSURE

One embodiment of the present disclosure is to provide an image display method for handling a dynamic image signal including a plurality of continuous video frames, wherein the method includes steps as follows: Firstly, a first display parameter is output to display an Nth video frame of the plurality of continuous video frames according to a first attribute data of the Nth video frame. Then, at least one of (N+K)th video frame is detected, and when the at least one of the (N+K)th video frames has second attribute data, the first display parameter is output to display the at least one of the (N+K)th video frame. Subsequently, an (N+K+1)th video frame is detected, and when the (N+K+1)th video frame has the second attribute data, a second display parameter is output to display the (N+K+1)th video frame according to the second attribute data. Wherein, K is a positive integer greater than 1.

Another embodiment of the present disclosure provides an image display apparatus for handling a dynamic image signal including a plurality of continuous video frames, wherein the image display apparatus includes a display device and a controller. The controller is used for performing steps as follows: Firstly, a first display parameter is output to the display device for displaying an Nth video frame of the plurality of continuous video frames according to a first attribute data of the Nth video frame. Then, at least one of (N+K)th video frame is detected, and when the at least one of the (N+K)th video frame has a second attribute data, the first display parameter is output to the display device for displaying the at least one of the (N+K)th video frame. Subsequently, an (N+K+1)th video frame is detected, and when the (N+K+1)th video frame has the second attribute data, a second display parameter is output to the display device for displaying the (N+K+1)th video frame according to the second attribute data. Wherein, K is a positive integer greater than 1.

Yet another embodiment of the present disclosure provides an image display system for handling a dynamic image signal including a plurality of continuous video frames, wherein the image display system includes a first display device, a cloud database, a second display device and a controller. The controller is used for performing steps as follows: Firstly, a first display parameter is output to the display device for displaying an Nth video frame of the plurality of continuous video frames according to a first attribute data of the Nth video frame. Then, at least one of (N+K)th video frame is detected, and when the at least one of the (N+K)th video frame has a second attribute data, the first display parameter is output to the display device for displaying the at least one of the (N+K)th video frame. Subsequently, an (N+K+1)th video frame is detected, and when the (N+K+1)th video frame has the second attribute data, a second display parameter is output to the display device for displaying the (N+K+1)th video frame according to the second attribute data. Wherein, K is a positive integer greater than 1. The cloud database is connected to the controller with a telecommunication, and stores these continuous video frames and corresponding data related to the first display parameter and the second display parameter. The second display device is connected to the cloud database with a telecommunication, and displays these continuous video frames based on the corresponding data.

According to the above embodiments, an image display apparatus, an image display system and the method applying the same are provided. By detecting the attribute data of each video frame of a dynamic image signal, the scene switching of the dynamic image signal can be figured out, and the display parameter of each video frame output to the display device can be controlled by a controller according to the attribute data. When a scene switching occurs, an old display parameter for displaying the video frames of the previous scenes is used to take the place of a new display parameter for displaying the new video frame, at the beginning of the switched scenes, to display the at least one new video frame (which is referred to as delaying to output the new display parameter). After that, the new display parameter corresponding to the subsequent new video frames are output to the display device for displaying the subsequent new video frames. The mosaic phenomenon and flash effect generated due to the scene switching can be alleviated by the delay of outputting the new display parameters for displaying the new video frames of the dynamic image signal. Thereby, the viewing quality of the users can be improved.

In some embodiment, in addition to delaying to output the new display parameters, the new display parameters can be output in progressively changing manner to further ease the visual discomfort to the user caused by the frequent switching of the video frames and scenes of the dynamic image signal.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides an image display apparatus, an image display system and the method applying the same to alleviated mosaic phenomenon and flash effect generated during the scene switching to improve the viewing quality. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1:
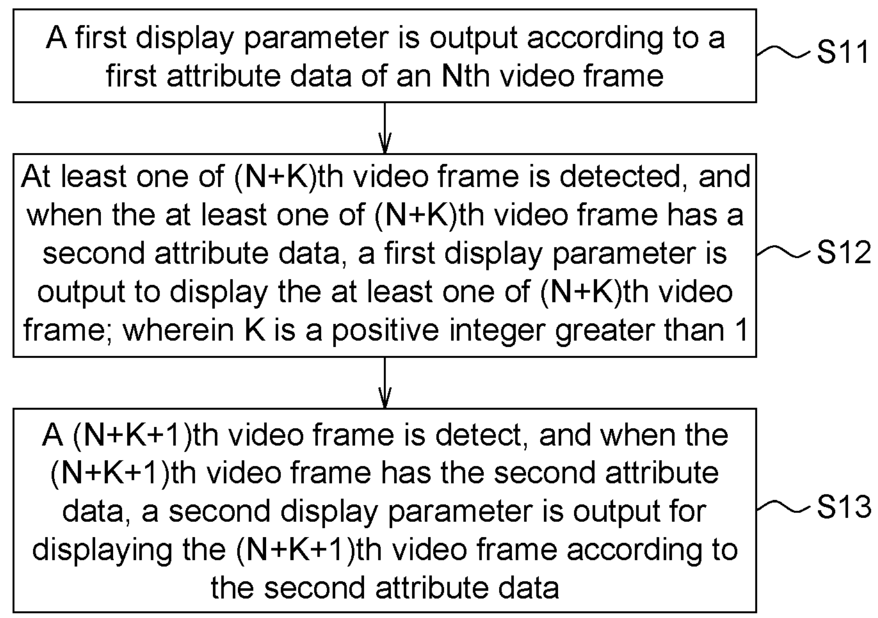
FIG. 1 is an operation flow chart of an image display method for handling a dynamic image signal including a plurality of continuous video frames according to one embodiment of the present disclosure.
Figure 2:
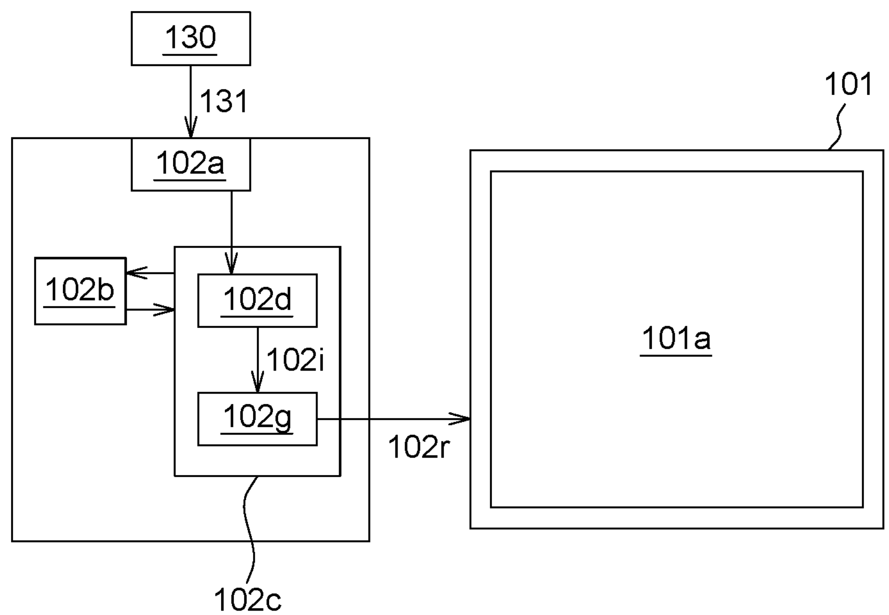
FIG. 2 is a functional block diagram of an image display apparatus for performing the image display method as depicted in FIG. 1.

FIG. 1 is an operation flow chart of an image display method for handling a dynamic image signal including a plurality of continuous video frames according to one embodiment of the present disclosure, and FIG. 2 is a functional block diagram of an image display apparatus 100 for performing the image display method as depicted in FIG. 1.

The display apparatus 100 includes a display device 101 and a controller 102. The display device 101 can display dynamic image signal 131 including a plurality of continuous video frames provided by a multimedia signal source 130. For example, in some embodiments of the present disclosure, the display device 101 may be a projector or a flat-panel display. In the present embodiment, the display device 101 may be (but not limited to) a projector.

The controller 102 is used to perform the image display method shown in FIG. 1. In some embodiments of the present disclosure, the controller 102 can be (but not limited to) built in the projector. The controller 102 may (but is not limited to) include a data receiving device 102*a*, a memory device 102*b*, and a judging device 102*c*. The data receiving device 102*a* may include a signal connection port for receiving the dynamic image signal 131 provided by the multimedia signal source 130. The judging device 102*c* may include a decoder 102*d* and a detection logic 102*g* for processing the dynamic image signal 131 and outputting a display parameter 102*r* to the display device 101. The memory device 102*b* is used to store the dynamic image signal 131, the display parameter 102*r*, and other processing information of the judging device 102*c*.

The decoder 102*d* is used to analyze and identify the multimedia feature index 102*i* of each of the plurality of consecutive video frames in the dynamic image signal 131. In some embodiments of the present disclosure, the multimedia feature index 102*i* of each video frame that is obtained through the analysis and identification of the decoded device 102*d* can be (but not limited to) a color feature index value, a shape feature index value, a brightness feature index value, or any combination thereof.

The detection logic 102*g* may include an artificial intelligence (AI) algorithm to summarize, identify and compare the multimedia feature index 102*i* of each video frame. After the operation of the detection logic 102*g*, a display parameter 102*r* is output to the display device 101. The image content corresponding to the video frames is then displayed on the screen 101*a* according to the received the display parameter 102*r* by the display device 101. In some embodiments of the present disclosure, the display parameter 102*r* output to the display device 101 may include (but are not limited to) the color light energy distribution (RBG energy distribution) control data, contrast control data, gamma correction data, color coordinate control data, image sharpness data or any combination thereof.

In some embodiments of the present disclosure, the memory device 102*b* may be a non-volatile memory (NVM) built in the display device 101 for storing the continuous video frames of the dynamic image signal 131, the multimedia feature index 102*i* obtained by the analysis and identification of the decoder 102*d*, the display parameter 102*r* output to the display device 101 by the detection logic 102*g*, and other corresponding data. In some other embodiments of the present disclosure, the memory device 102*b* can also be connected to an external cloud database (not shown) through an internet.

Figure 3:
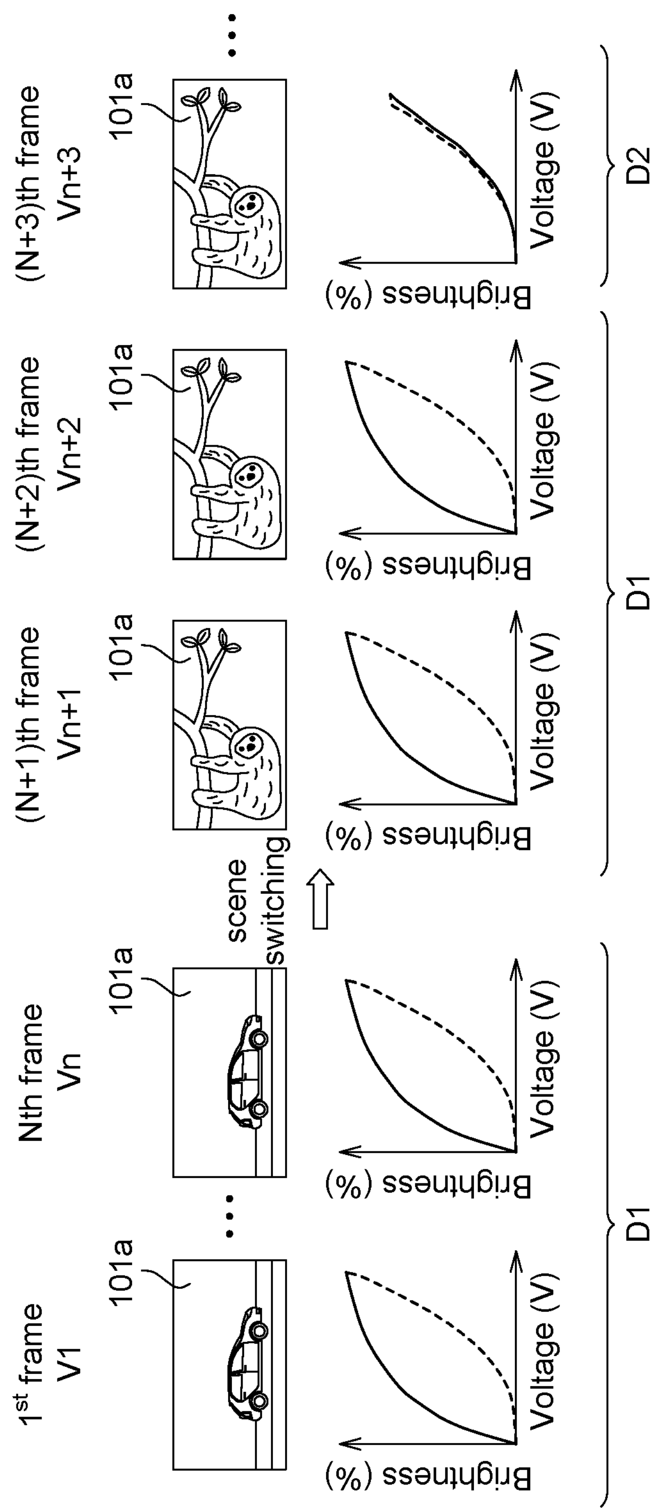
FIG. 3 is a schematic diagram illustrating a series of images of switching video frames as performing the image display method according to one embodiment of the present disclosure.

FIG. 3 is a schematic diagram illustrating a series of image of switching video frames as performing the image display method according to one embodiment of the present disclosure. Firstly, referring to step S11, a first display parameter is output by a controller 102 according to a first attribute data of an Nth video frame. When the controller 102 receives the dynamic image signal 131 related to the video frames (e.g., the first to Nth video frames) provided by the multimedia signal source 130, multimedia feature index 102*i* (also referred to as the first attribute data) can be obtained by performing an operation using the judging device 102*c* of the controller 102. Meanwhile, the display parameter 102*r* (also referred to as the first display parameters) of the video frames (e.g., the first to Nth video frames) can be generated according to the arithmetic logic referencing to the multimedia feature index 102*i* and output to the display device 101. The image content corresponding to the video frames (e.g., the first to Nth video frames) are then displayed on the screen 101*a* according to the display parameter 102*r* received by the display device 101.

For example, in the present embodiment, N may be an integer greater than 10. Among the dynamic image signal 131 provided by the multimedia signal source 130, the video frames (e.g., the first to Nth video frames) are image information related to a car racing. Since the scenes of each video frame are similar, thus these images of the video frames have little difference in the color and tones. In other words, the multimedia feature index 102*i* (for example, including the color feature index value, the shape feature index value, the brightness feature index value) of the video frames (e.g., the first to Nth video frames) obtained from the operation of the judging device 102*c* of the controller 102 would be quite similar.

Each of the first to Nth video frames have substantially the same attribute data, such as the first attribute data. In some embodiments, the term of "substantially the same attribute data" means that any adjacent two of the first to Nth video frames have substantially the same multimedia feature index 102*i* (for example, the color feature index value, the shape feature index value, the brightness feature index value or any combination of the above), and each value in the multimedia feature index 102*i* of these two may have (but not limited to) average deviation value substantially between 0% to 15%. Similarly, the display parameter 102*r* (e.g. including image color light energy distribution, contrast, color light gamma value, color coordinates, or any combination of the above) output from the controller 102 to the display device 101 for displaying images based on the first to Nth video frames would be quite similar. Such that, it can say that each of the first to Nth video frames have the first attribute data.

In the present embodiment, the display parameter 102*r* that is outputted from the controller 102 to the display device 101 for displaying the images from V1 to Vn of the first to Nth video frames may include a screen voltage and brightness conversion curve, also called gamma curve D1, in which the horizontal axis is voltage (V) and the vertical axis is brightness (%), and each gamma curve D1 includes multiple curves representing different colors of light. According to the gamma curve D1 and other display parameters 102*r* (e.g. including image color light energy distribution, contrast, color light gamma value, color coordinates, or any combination of the above) that are output from the controller 102 to the display device 101, the display device 101 can convert the dynamic image signal 131 of the first to Nth video frames into the first image V1 to Nth images Vn and display them on the screen 101*a*, as shown in FIG. 3.

Next, referring to step S12, at least one of (N+K)th video frame is detected, and when the at least one of (N+K)th video frame has a second attribute data, the first display parameter is output to display the at least one of (N+K)th video frame. Wherein, K is a positive integer greater than 1. For example, in the present embodiment, K is equal to 2 (K=2). The dynamic image signal 131 provided by the multimedia signal source 130 may be switched, starting at the N+1 frame, from a car racing scene to a scene related to forest or animals; and after the N+3 frame, the scene of the dynamic image signal 131 may be still maintained as the forest or animal-related scenes or switched to other scenes.

The multimedia feature index 102*i* of the (N+1)th and (N+2)th video frames (i.e. the second attribute data) obtained by the operation of the judgment device 102C of the controller 102 are different from that of the first to Nth video frames (i.e. the first attribute data). At this moment, if the judging device 102*c* of the controller 102 directly outputs a second display parameter (e.g. including the gamma curve with different brightness-voltage conversion relationships) that is different from the first display parameter of the first to Nth video frames according to the obtained multimedia feature index 102*i* to the display device 101, transient mosaic phenomenon and flashing effect may occur due to sudden scene switching and instant colors change on the screen 101*a*, so as to produce afterimages in the eyes of the user.

In order to solve this problem, in the present embodiment, the detection logic 102*g* in the judging device 102 of the controller 102 will forcibly output the first display parameter (for example, including the gamma curve D1) of the first to Nth video frame to the display device 101 for substituting the second display parameter of the (N+1)th and the (N+2)th video frames. Meanwhile, the display device 101 converts the dynamic image signal 131 of the (N+1)th and (N+2)th video frames into images (Vn+1) and Vn+2 of the (N+1)th and (N+2)th video frames, and displays them on the screen 101*a* (as shown in FIG. 3). The visual discomfort of the user caused by the sudden scene switching on screen 101*a* can be alleviated by controlling the color and tones of the images (Vn+1) and (Vn+2) displayed at the beginning of the scene switching to get close to that of the images V1 to Vn displayed prior the scene switching.

Of note that the value of K can be decided by the judging device 102 according to the difference between these two different attribute data (that is, the first attribute data and the second attribute data) of the video frames before and after the scene switching (before and after the Nth video frame). For example, in an embodiment of the present disclosure, the detection logic 102*g* can use the color number of each frame (e.g., the color ramp value of a specific area in the frame or its average value overall the frame) as the multimedia feature index 102*i* to determine whether the two adjacent frames have the same attribute data through an artificial intelligence algorithm, so as to decide the number of frames (i.e., the value of K) displayed using the forcible first display parameter, before the parameter 102*r* and other corresponding data are output to the display device 101. When the difference between the color numbers (e.g., the average value of the color ramp value) of the first attribute data and the second attribute data is greater, the value of K can be larger. By increasing the number of frames displayed using the forcible first display parameter, the visual discomfort of the user caused by the sudden scene switching on screen 101*a* can be further alleviated.

Subsequently, referring to step S13, an (N+K+1)th video frame is detect, and when the (N+K+1)th video frame has the second attribute data, the second display parameter is output to the display device 101 for displaying the (N+K+1)th video frame according to the second attribute data. For example, in the present embodiment, after the dynamic image signal 131 provided by the multimedia signal source 130 is analyzed and compared by the judging device 102*c* of the controller 102, and when the multimedia feature index 102*i* of the (N+K+1)th video frame (that is, the (N+3)th frame, K=2) is found substantially the same or similar to the second attribute data of the (N+1)th to (N+2)th frames; the judging device 102*c* of the controller 102 may determine that the (N+3)th frame has the same scene as the (N+1)th to (N+2)th video frames; and then output the second display parameter (for example, a gamma curve D2 having a different brightness-voltage conversion relationship) that is different from the first display parameter of the first to Nth video frames to the display device 101 according to the second attribute data of the (N+K+1)th frame. The display device 101 subsequently converts the dynamic image signal 131 of the (N+3)th video frame into the image (Vn+3), and displays it on the screen 101*a*, wherein the image (Vn+3) of the (N+3)th video frame has the forest or animal-related scenes (as shown in FIG. 3).

Figure 4:
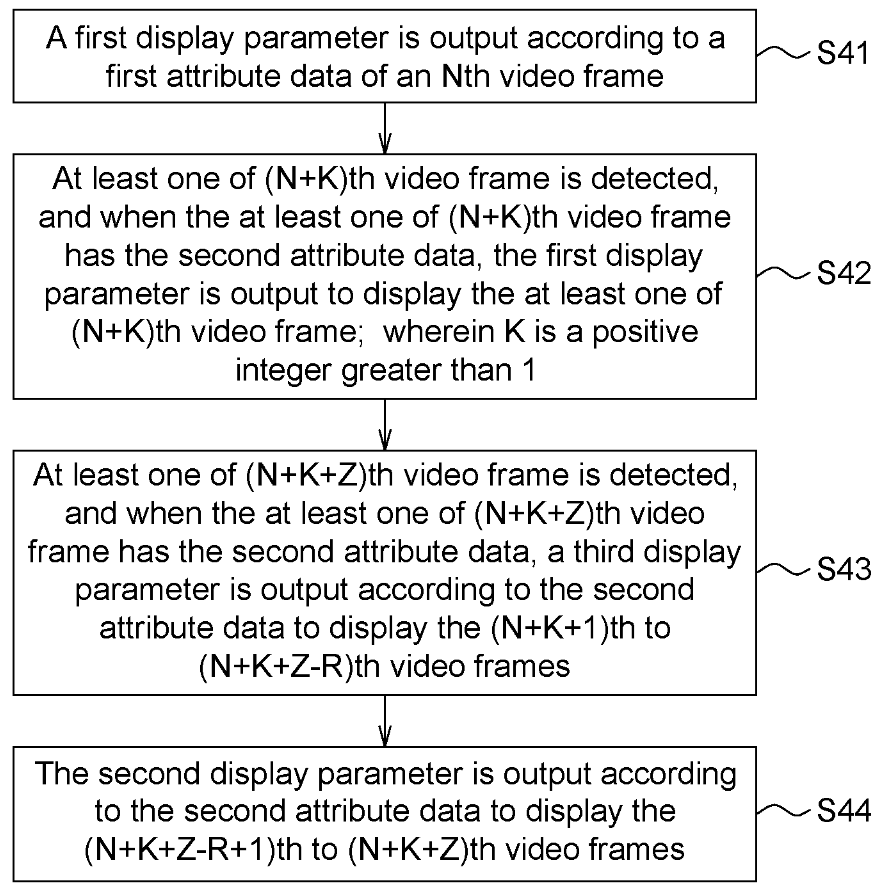
FIG. 4 is an operation flow chart of an image display method for handling a dynamic image signal including a plurality of continuous video frames according to another embodiment of the present disclosure.

FIG. 4 is an operation flow chart of an image display method for handling a dynamic image signal including a plurality of continuous video frames according to another embodiment of the present disclosure. The image display methods as described in FIGS. 1 and 4 are substantially similar. The difference is that the image display method as described in FIG. 4 further includes an (transitional parameter) adjusting step during the scene switching.

Figure 5:
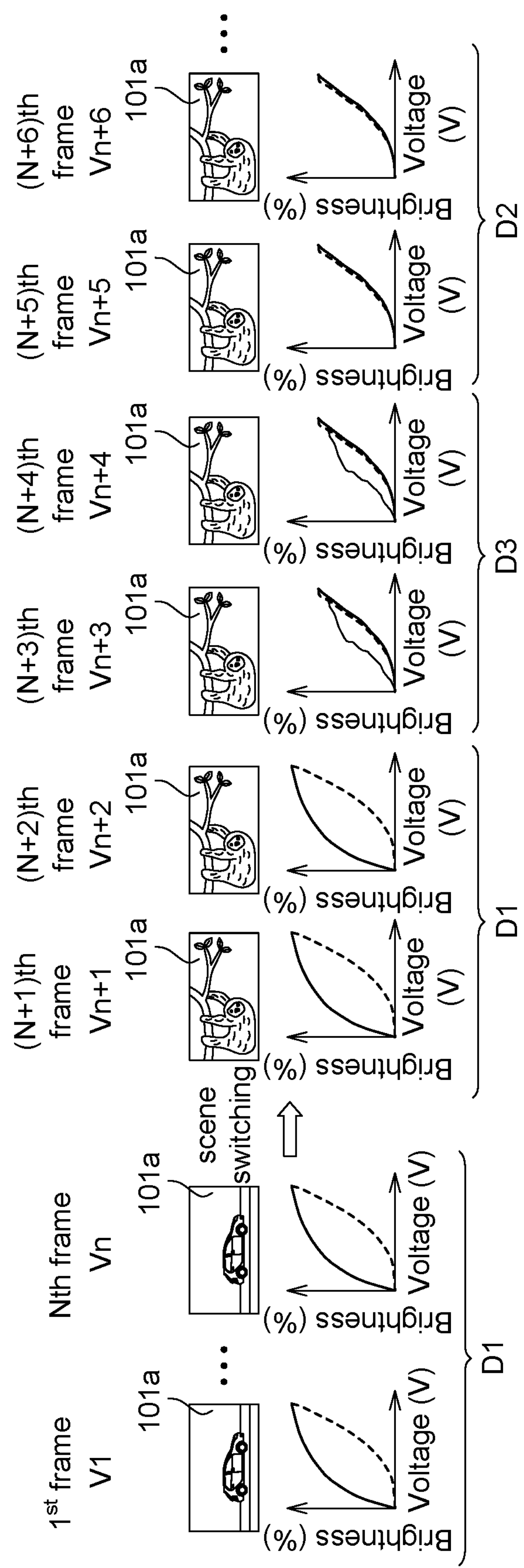
FIG. 5 is a schematic diagram illustrating a series of images when switching a plurality of video frames to perform the image display method according to another embodiment of the present disclosure.

FIG. 5 is a schematic diagram illustrating a series of images when switching a plurality of video frames to perform the image display method depicted in FIG. 4. First, referring to step S41, a first display parameter is output by a controller 102 according to a first attribute data of an Nth video frame. When the controller 102 receives the dynamic image signal 131 related to the video frames (e.g. the first to Nth video frames) provided by the multimedia signal source 130, multimedia feature index 102*i* (also referred to as the first attribute data) can be obtained by performing an operation using the judging device 102*c* of the controller 102. Meanwhile, display parameters 102*r* (also referred to as the first display parameter) of the video frames (e.g. the first to Nth video frames) can be generated according to the arithmetic logic referencing to the multimedia feature index 102*i* and output to the display device 101. The image content corresponding to the video frames (i.e., the first to Nth video frames) are then displayed on the screen 101*a* according to the received display parameters 102*r* by the display device 101.

For example, in the present embodiment, N may be an integer greater than 10. Among the dynamic image signal 131 provided by the multimedia signal source 130, the video frames (e.g. the first to Nth video frames) are image information related to a car racing. Since the scenes of each video frame are similar, thus these images of the video frames have little difference in the color and tones. The display device 101 can convert the dynamic image signal 131 of the first to Nth frames into images V1 to Vn of the first to Nth video frames and display them on the screen 101*a* as shown in FIG. 5.

Next, referring to step S42, at least one of (N+K)th video frame is detected, and when the at least one of (N+K)th video frame has the second attribute data, the first display parameter is output to display the at least one of (N+K)th video frame. Wherein, K is a positive integer greater than 1. For example, in the present embodiment, K is equal to 2 (K=2). The dynamic image signal 131 provided by the multimedia signal source 130 may be switched, starting at the N+1 frame, from a car racing scene to a scene related to forest or animals.

At this moment, the detection logic 102*g* in the judging device 102 of the controller 102 will forcibly output the first display parameter (for example, including the gamma curve D1) that is used to display the first to Nth video frames to the display device 101 to substitute the second display parameter and use it to display the (N+1)th and the (N+2)th video frames. Meanwhile, the display device 101 converts the dynamic image signal 131 of the (N+1)th and (N+2)th video frames into images (Vn+1) and (Vn+2), and displays them on the screen 101*a* (as shown in FIG. 3). Although the scenes of the (N+1)th and (N+2)th video frames have been switched, the tones and colors of the images displayed on the screen 101*a* of the display device 101 are still the same as that of the car racing images.

Thereafter, referring to step S43, at least one of (N+K+Z)th video frame is detected, and when the at least one of (N+K+Z)th video frame has the second attribute data, a third display parameter is output according to the second attribute data to display the (N+K+1)th to (N+K+Z−R)th video frames. Wherein, Z and R both are positive integers greater than or equal to 1; and the difference of Z minus R (Z−R) is a positive integer greater than or equal to 1.

In the present embodiment, Z can be 3 and R can be 1 (Z=4, R=1). After the dynamic image signal 131 provided by the multimedia signal source 130 is analyzed and compared by the judging device 102*c* of the controller 102, and when the multimedia feature index 102*i* of the (N+K+Z)th video frame (that is, the N+6th frame, K=2, Z=4) is found substantially the same or similar to the second attribute data of the (N+1)th to (N+2)th frames; the judging device 102*c* of the controller 102 may determine that the (N+K+1)th to (N+K+Z)th video frames (i.e., the (N+3)th to (N+6)th video frames) have the same scene as that of the (N+1)th to (N+K+1)th video frames (i.e., the (N+1)th to (N+2)th video frames), which corresponds to the forest or animal-related scenes.

However, unlike the image display method described in FIG. 1, at this time, the controller 102 does not output the second display parameters to the display device 101 according to the second attribute data of the (N+K+Z)th frame. Instead, a third display parameter (for example, a gamma curve D3) that is different from the first display parameter (for example, the gamma curve D1) and the second display parameter (for example, the gamma curve D2) is output to the display device 101. Wherein, the third display parameter may be a transitional display parameter between the first display parameter and the second display parameter.

For example, in the present embodiment, the transitional display parameter may be a gamma curve D3 (as shown in FIG. 5) with a waveform between the gamma curve D1 (first display parameter) and the gamma curve D2 (second display parameter). The display device 101 can convert the dynamic image signal 131 of the (N+K+1)th to (N+K−R)th video frames (i.e., the (N+3)th to (N+4)th video frames) into images (Vn+3) to (Vn+4) and display them on the screen 101*a*. By this approach, the color tones of the images (Vn+3) to (Vn+4) of the (N+3)th to (N+4)th video frames may show the color tones between that of the racing scene and the forest or animal-related scenes (as shown in FIG. 5), the visual discomfort of the user can be further alleviated.

Subsequently, referring to step S44, the second display parameter is output according to the second attribute data to display the (N+K+Z−R+1)th to (N+K+Z)th video frames (i.e., the (N+5)th to (N+6)th video frames). The display device 101 can convert the dynamic image signal 131 of the (N+K+Z−R+1)th to (N+K+Z)th video frames into images (Vn+5) and (Vn+6) and display them on the screen, as shown in FIG. 5.

Figure 6:
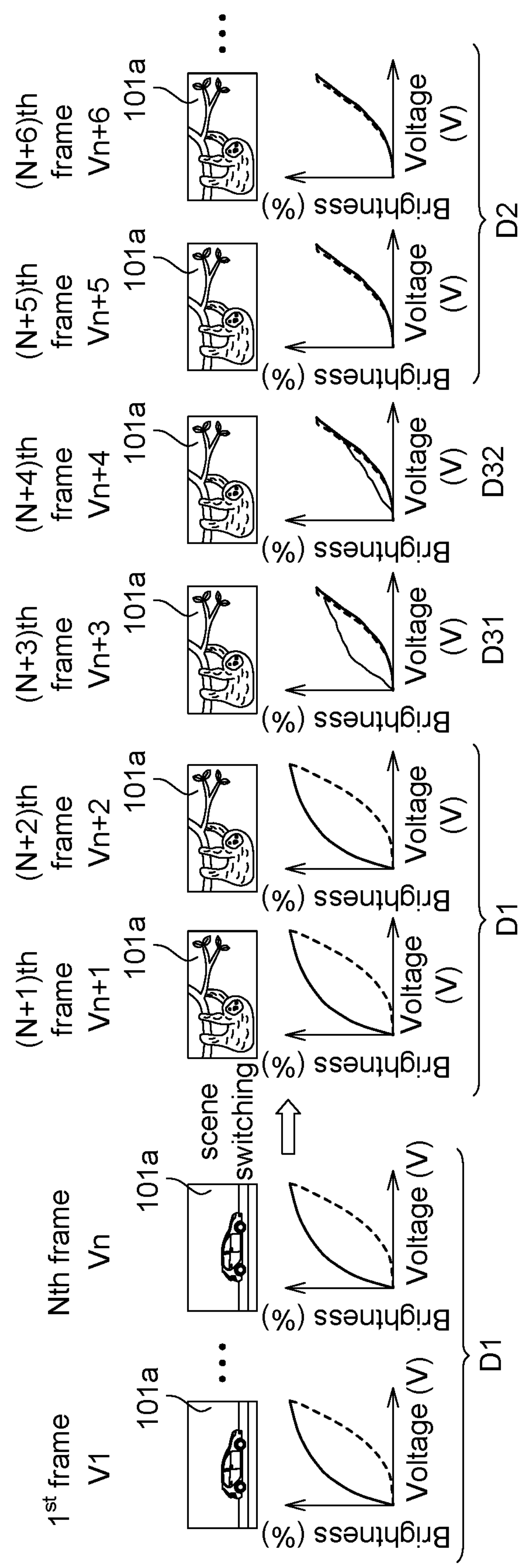
FIG. 6 is a schematic diagram illustrating a series of images when switching a plurality video frames to perform the image display method according to yet another embodiment of the present disclosure.

FIG. 6 is a schematic diagram illustrating a series of images when switching a plurality video frames to perform the image display method according to yet another embodiment of the present disclosure. The images depicted in FIG. 6 are similar to that depicted in FIG. 5, except that the third display parameters used to display the (N+K+1)th to (N+K+Z−R)th video frames (i.e., the (N+3)th to (N+4)th video frames) in FIG. 6 includes a plurality of sub-parameters (such as, gamma curves D31 and D32) gradually changing between the first display parameter (e.g., the gamma curve D1) and the second display parameter (e.g., the gamma curve D2).

For example, in the present embodiment, the controller 102 forcibly outputs a first sub-display parameter (the gamma curve D31) and a second sub-display parameter (the gamma curve D32) serving as the third display parameters to the display device 101 to respectively display the (N+K+1)th video frame (i.e., the (N+3)th video frame) and the (N+K+Z−R)th video frame (i.e., the (N+4)th video frame). Wherein, the first sub-display parameter (i.e., the gamma curve D31) is closer to the first display parameter (i.e., the gamma curve D1) than the second sub-display parameter (i.e., the gamma curve D32);

and the second sub-display parameter is closer to the second display parameter (i.e., gamma curve D2) than the first sub-display parameter.

By outputting the progressively changing first sub-display parameter (e.g., the gamma curve D31) and second sub-display parameter (e.g., the gamma curve 32) to the display device 101, the color and tones of the image (Vn+2) of the (N+2)th video frame (displayed by the gamma curve D1), the image (Vn+3) of the (N+3)th video frame (displayed by the gamma curve D31), the image (Vn+4) of the (N+4)th video frame (displayed by the gamma curve D32) and the image (Vn+5) of the (N+5)th video frame (displayed by the gamma curve D2) can show gradual changes and adjustments on the screen 101*a* of the display device 101, during the scene switching, as the scene of the images switched. Such that Mosaic phenomenon and flashlight effect caused by rapid scene switching can be alleviated more efficiently. Thereby, the viewing quality of the users can be improved.

Figure 7:
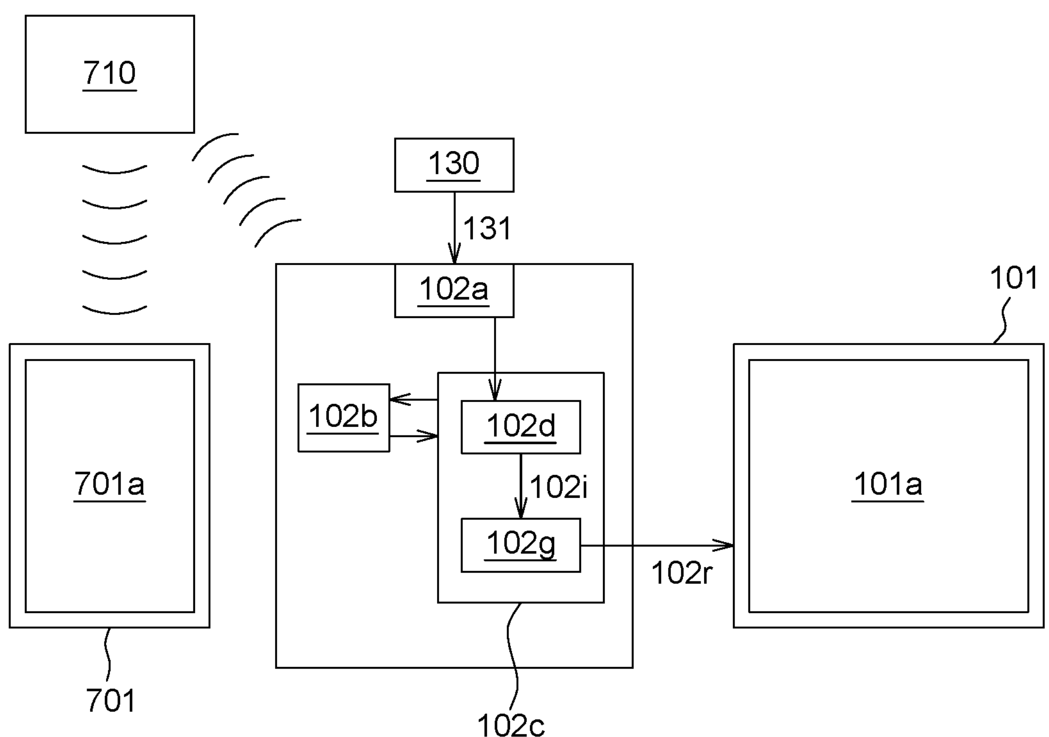
FIG. 7 is block diagram illustrating an image display system for performing the image display method according to yet another embodiment of the present disclosure.

The aforementioned display device 100 can be integrated with other devices to form an image display system 70 for displaying the dynamic image signal 131 including a plurality of continuous video frames. For example, FIG. 7 is block diagram illustrating an image display system 70 for performing the image display method according to yet another embodiment of the present disclosure.

In the present embodiment, in addition to the display 100, the image display system 70 further includes a cloud database 710 and another display device 701. The controller 702 may be either built in the display device 100 or independently provided. The cloud database 710 is connected to the display device 100 and the controller 702 respectively with telecommunications, and stores the dynamic image signal 131 that is used to display the plurality of continuous video frames on the display device 100 and all related corresponding data, including the multimedia feature index 102*i* and display parameter 102*r* of each video frame (such as, the first display parameter, the second display parameter, and the third display parameter). The display device 701 can be also connected to the cloud database 710 with a telecommunication, and display the continuous video frame of the dynamic image signal 131 on its screen 701*a*, in synchronization with (but not limited to this) the display 100, according to the above corresponding data.

According to the above embodiments, an image display apparatus, an image display system and the method applying the same are provided. By detecting the attribute data of each video frame of a dynamic image signal, the scene switching of the dynamic image signal can be figured out, and the display parameter of each video frame output to the display device can be controlled by a controller according to the attribute data. When a scene switching occurs, an old display parameter for displaying the video frames of the previous scenes is used to take the place of a new display parameter for displaying the new video frame, at the beginning of the switched scenes, to display the at least one new video frame (which is referred to as delaying to output the new display parameter). After that, the new display parameter corresponding to the subsequent new video frames are output to the display device for displaying the subsequent new video frames. The mosaic phenomenon and flash effect generated due to the scene switching can be alleviated by the delay of outputting the new display parameters for displaying the new video frames of the dynamic image signal. Thereby, the viewing quality of the users can be improved.

In some embodiment, in addition to delaying to output the new display parameters, the new display parameters can be output in progressively changing manner to further ease the visual discomfort to the user caused by the frequent switching of the video frames and scenes of the dynamic image signal.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image display method for handling a dynamic image signal including a plurality of continuous video frames, wherein the image display method comprises:

outputting a first display parameter to display an Nth video frame of the plurality of continuous video frames according to a first attribute data of the Nth video frame;

detecting at least one of (N+1)th to (N+K)th video frames, and when the at least one of the (N+1)th to the (N+K)th video frames has a second attribute data, the first display parameter is output to display the at least one of the (N+1)th to the (N+K)th video frames;

detecting at least one of (N+K+1)th to (N+K+Z)th video frames, and when the at least one of the (N+K+1)th to the (N+K+Z)th video frames has the second attribute data, outputting at least one third display parameter according to the second attribute data to display the (N+K+1)th to (N+K+Z-R)th video frames; and outputting a second display parameter according to the second attribute data to display (N+K+Z−R+1)th to the (N+K+Z)th video frames;

wherein Z, R and (Z−R) are positive integers greater than or equal to 1, and N and K are integers greater than 1, the (N+K+1)th to the (N+K+Z)th video frames are greater than 3 continuous video frames.

2. The image display method according to claim 1, wherein the at least one third display parameter is a transitional display parameter between the first display parameter and the second display parameter.

3. The image display method according to claim 1, wherein the at least one third display parameter comprises a plurality of sub-parameters gradually changing between the first display parameter and the second display parameter.

* * * * *